(12) United States Patent
Fang

(10) Patent No.: US 8,455,786 B2
(45) Date of Patent: Jun. 4, 2013

(54) ELECTRODE HEAD OF THE PLASMA CUTTING MACHINE

(76) Inventor: Wen-Yi Fang, Yangmei (TW)

( * ) Notice: Subject to any disclaimer, the term of this patent is extended or adjusted under 35 U.S.C. 154(b) by 0 days.

(21) Appl. No.: 13/355,711

(22) Filed: Jan. 23, 2012

(65) Prior Publication Data

US 2012/0193332 A1    Aug. 2, 2012

(30) Foreign Application Priority Data

Jan. 31, 2011   (TW) .............................. 100103587 A

(51) Int. Cl.
*B23K 10/00* (2006.01)
(52) U.S. Cl.
USPC ............ 219/121.52; 219/121.48; 219/121.39; 219/119; 313/231.41
(58) Field of Classification Search
CPC ....................................................... B23K 10/00
USPC ............ 219/121.39, 121.48, 121.52, 121.45, 219/121.36, 75, 119; 313/231.41, 231.51
See application file for complete search history.

(56) References Cited

U.S. PATENT DOCUMENTS

| 5,023,425 | A | * | 6/1991 | Severance, Jr. | 219/121.59 |
| 5,097,111 | A | * | 3/1992 | Severance, Jr. | 219/121.52 |
| 6,423,922 | B1 | * | 7/2002 | Nemchinsky | 219/121.52 |
| 6,483,070 | B1 | * | 11/2002 | Diehl et al. | 219/121.52 |
| 6,528,753 | B2 | * | 3/2003 | McBennett | 219/121.52 |
| 7,659,488 | B2 | * | 2/2010 | Cook et al. | 219/121.52 |

* cited by examiner

*Primary Examiner* — Mark Paschall
(74) *Attorney, Agent, or Firm* — Ming Chow; Sinorica, LLC

(57) ABSTRACT

An electrode head of the plasma cutting machine is provided. The electrode head comprises a sheath, a bearing means, an electrode core, a first brazing means and a second brazing means. The sheath has a first end and a second end. A first flange extends radially inward from the first end. The bearing means has a third end and a fourth end. A second flange extending from the third end is fixed to the first flange of the sheath via the first brazing means. A protrusion portion is provided axially from the interior of the fourth end. A recess portion is extending from the third end into the interior of the protrusion portion. The electrode core is fixed in the recess portion via the second brazing means.

10 Claims, 3 Drawing Sheets

ELECTRODE HEAD OF THE PLASMA CUTTING MACHINE

BACKGROUND OF THE INVENTION

1. Technical Field

The present invention relates to the field of plasma cutting machines, and more particularly, to an electrode head of the plasma cutting machine.

2. Description of Related Art

Plasma cutting machines are machines using plasma cutting for the working of metals. The heat with high temperature produced by the plasma arc torch can be used for partially melting (and vaporizing) the metal workpiece, and then the melted metal can be removed by the plasma. They are commonly used for cutting metals which are hard to be cut. Especially, the plasma cutting machines work well toward the nonferrous metal, for example stainless steel, aluminum, copper, titanium, nickel. When cutting metals with relatively thin thickness, especially the plain carbon steel plate, plasma cutting achieves a 5~6 times higher speed than hydrogen oxygen cutting; In addition, the cutting surface is smooth, the heat deformation is small and the heat affected zone can hardly be observed. Therefore, plasma cutting is commonly used for cutting metals in the metal processing industry.

The electrode head has great effect upon the cutting characteristics, cutting quality, and cutting speed of the plasma arc. The electrode head is normally an assembly of sheath, bearing, and electrode. Commonly, the assembly of the electrode head is conducted by interference fit for engaging the different parts. However, the electrode heads have to be made with great precision. It's not easy to process, assemble or disassemble the electrode head by using interference fit. There are three basic methods for assembly with interference fit:

(1) Press fit method: Press fit is achieved with presses that can press the parts together with very large amounts of force. The presses may operate by hammers or press machines. However, extra jig is necessary for fixing the workpieces in this method. It's not easy to install the jig or to fix the workpieces on the jig when the workpieces have relatively small size. In addition, the compression occurred at once in the procedure of press-in loosens the engagement between the jig and the workpieces, and it conducts defects of the electrode heads. Therefore, using press fit method to assemble the electrode head with requirement of high precision and high accuracy is suffered from frequent defective products and the higher cost produced thereby.

(2) Thermal expansion method: Most materials expand when heated and shrink when cooled. In this method, the sheath is heated to expanse the hollow core of it, and the rod-shaped electrode is assembled into the hollow core of the sheath while hot, then they are allowed to cool and contract back to their former size. The common heating method is to put the sheath in to the hot water (80° C.~100° C.) or hot oil (90° C.~320° C.).

(3) Thermal contraction method: Alternatively, the rod-shaped electrode may be cooled before assembly such that it slides easily into the hollow core of the sheath. Upon warming, it expands and interferes. Cooling is often conducted by dry ice or liquid nitrogen. In the thermal expansion or contraction method, an extra thermal treatment is necessary, therefore the assembly of the electrode head becomes more complicated and difficult.

Therefore, an improved electrode head assembly method is needed in this field of industry to resolve the problems in the prior arts for correctly engaging all the parts of the electrode with more simple process and less defective products.

SUMMARY OF THE INVENTION

To overcome the shortcomings of the prior arts mentioned above, the present invention provides an electrode head of the plasma cutting machine. The electrode head of the plasma cutting machine comprises a sheath, a bearing means, an electrode core, a first brazing means and a second brazing means. The second brazing means consists of copper and silver. The sheath is hollow inside and comprises a first end and a second end. A first flange extends radially from the first end into the interior of the sheath. The bearing means is rod-shaped and comprises a third end and a fourth end. A second flange extends radially outward from the third end and the second flange is fixed to the first flange of the sheath via the first brazing means. A protrusion portion is formed on the fourth end and protrudes toward the interior of the sheath. A recess portion is defined in the axial interior of the protrusion portion with an opening on the third end. The electrode core is disposed in the recess portion and fixed to the bearing means via the second brazing means, wherein the electrode core is made of hafnium.

Accordingly, the primary object of the present invention is to provide an electrode head of the plasma cutting machine assembled by brazing. The second flange is fixed to the first flange of the sheath via the first brazing means. The electrode core is disposed in the recess portion and is fixed to the bearing means via the second brazing means. In the present invention, no interference fit is needed, so no high compression force is needed to apply during the manufacturing. Therefore, there are less defective or deformed electrode heads produced in the manufacturing process. Meanwhile, the engagement strength achieved by the brazing is greater than that achieved by the interference fit, the electrode head of the present invention has higher mechanical strength.

Another object of the present invention is to provide an electrode head of the plasma cutting machine with higher cutting efficiency since it has higher electrical conductivity by being assembled by brazing than the one assembled by the interference fit in the prior art.

Still another object of the present invention is to provide an electrode head of the plasma cutting machine having the electrode core being made of hafnium, thereby the electrode head of the present invention has better discharging efficiency and heat dissipating efficiency than the prior arts.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Some particular embodiments of the invention will be described in detail for purpose of illustration, and one of ordinary skill in the art can easily understand the advantages and efficacy of the present invention through the disclosure of the specification. It is to be understood that alternative embodiments may be possible for the implement and application of the present invention while numerous variations will be possible to the details disclosed in the specification on the strength of diverse concepts and applications without going outside the scope of the invention as disclosed in the claims.

The present invention disclose an electrode head of the plasma cutting machine, wherein the concept and the working method of the plasma cutting machine is well known by those having ordinary skills in the art, therefore the description below will not describe it in detail.

It's necessary for the electrode head of the plasma cutting machine to have high electrical conductivity. The higher electrical conductivity of it conducts the better operation efficiency of it. In addition, the electrode head also needs high mechanical strength, endurance for the high temperature and high electron emissivity. The metal having the highest electrical conductivity is silver, and the following ones in order are copper, gold, and aluminum. However, the electrode core of the electrode head produces electric arc by discharging during the operation of the plasma cutting machine, it produces high temperature consequently. The melt points of silver and gold are too low for being applied as the electrode core of the electrode head, although they have high electrical conductivity. On the other hand, the cost is too high to have the electrode wholly made of silver. Therefore, the present invention provides a novel electrode head for being used in the plasma cutting machine with appropriate combination of copper, silver, and other metals with high electrical conductivity. Thereby, the electrode head according to the present invention has high electrical conductivity, high mechanical strength, and high discharging efficiency with lower material cost.

Figure 1:
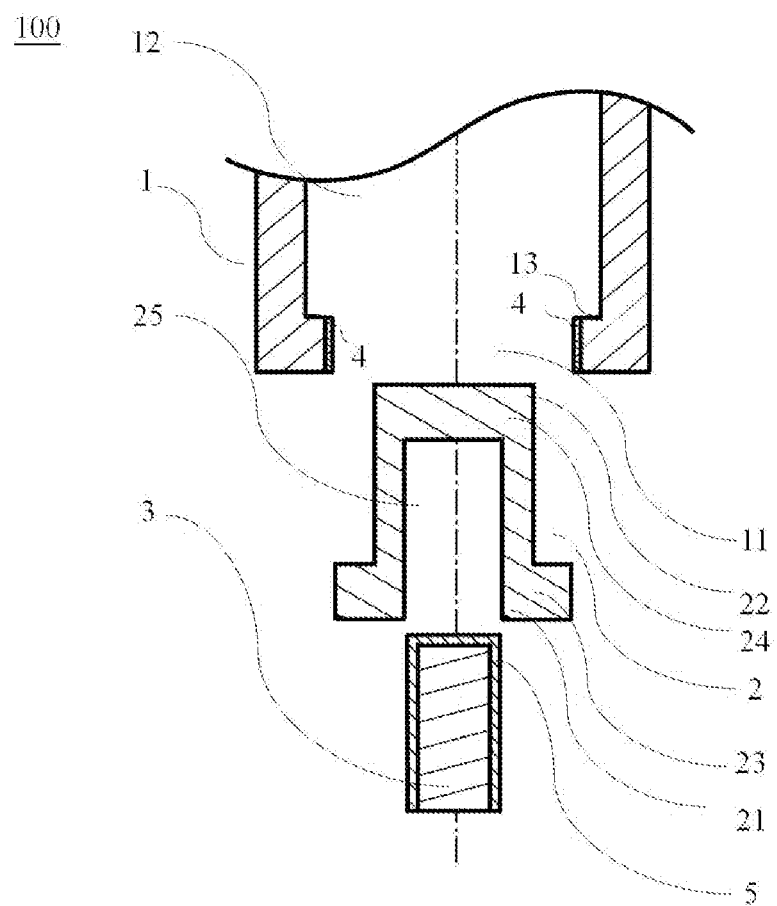
FIG. 1 is an exploded view of an electrode head of the plasma cutting machine according to a preferred embodiment of the present invention.
Figure 2:
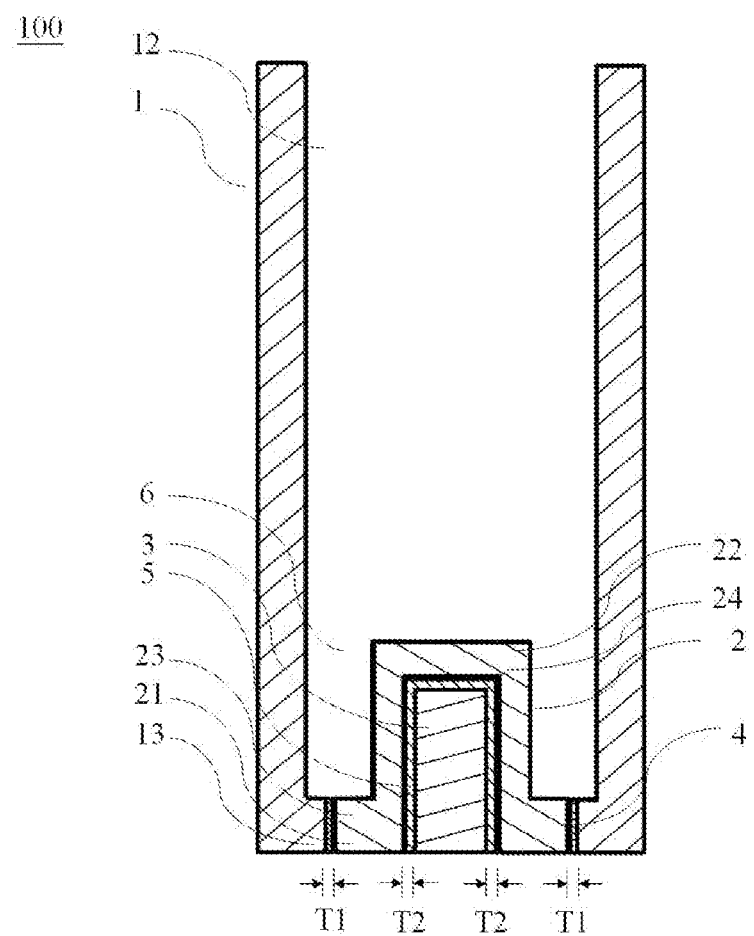
FIG. 2 is a cross-sectional view of an electrode head of the plasma cutting machine according to a preferred embodiment of the present invention.

As shown in FIG. 1, an electrode head 100 of the plasma cutting machine is disclosed according to a preferred embodiment of the present invention. The electrode head 100 comprises a sheath 1, a bearing means 2, an electrode core 3, a first brazing means 4 and a second brazing means 5. It is preferred for the sheath 1 to be copper tube with hollow interior, or to be tube made of other metals with good electrical conductivity depending on demands. The sheath 1 comprises two opposite open ends, i.e., a first end 11 and a second end 12. A first flange 13 extends radially inward from the first end 11 into the interior of the sheath 1. It is preferred for the bearing means 2 to be rod-shaped silver because the silver is the metal with highest electrical conductivity. The bearing means 2 comprises two opposite open ends, i.e., the third end 21 and the fourth end 22. A second flange 23 extends radially outward from the third end 21. Referring to FIG. 2, the second flange 23 is fixed to the first flange 13 of the sheath 1 via the first brazing means 4. As shown in FIG. 1, a protrusion portion 24 is formed on the fourth end 22 and protrudes toward the interior of the sheath 1. A recess portion 25 is defined in the axial interior of the protrusion portion 24 with an opening on the third end 21. The electrode core 3 is disposed in the recess portion 25 and is fixed to the bearing means 2 via the second brazing means 5.

Referring to FIG. 2, the electrode core 3 is preferably made of metal with thermal endurance of high temperature and high discharging efficiency. The melt point of hafnium is around 2200° C. and hafnium is not oxidized easily in the normal atmospheric temperature. Therefore, it is preferred for the electrode core to be made of hafnium or zirconium.

In the preferred embodiment, it is noticeable that according to the present invention, the first brazing means 4 and the second brazing means 5 have higher thermal endurance by brazing (when compared with soldering). During the manufacturing, it will not harm the objects to be welded by using the brazing when compared to the arc welding. Therefore, it is preferred in the present invention to assemble the electrode head by using brazing rather than soldering and arc welding. At the same time, in order to successfully fix the electrode core 3 to the bearing means 2, the second brazing means 5 can only consist of silver and copper. If any other metals or impurities are in the second brazing means 5, the electrode core 3 can't be firmly fixed to the bearing means 2. It is preferred for the second brazing means 5 to comprise 20%~80% silver. In the preferred embodiment, the second brazing means 5 is formed in a shape of tube with thin wall, and the thickness T2 of the second brazing means 5 is in the range from 0.01 mm to 5 mm. It is also preferred that the thickness T1 of the first brazing means 4 is in the range from 0.01 mm to 5 mm. The thickness T1 of the first brazing means and the thickness T2 of the second brazing means can be adjusted depending on demands.

It is preferred that the electrode core 3 to be rod-shaped and the recess portion 25 is defined for disposing the correspondingly rod-shaped electrode core 3. The electrode core 3 is further preferably in the shape of cylinder of equal radius, thereby the electrode head has relatively higher mechanical strength. The electrode core 3 can also be in the shape of prism, like triangular prism or tetragonal prism, etc. Referring to FIG. 2, the protrusion portion 24 of the bearing means 2 is made of silver. For lowering the manufacturing cost, it is preferred for the protrusion portion 24 to be formed as a cylinder of equal radius by lathe cutting. An annular space 6 is defined between the protrusion portion 24 and the sheath 1 for allowing the cooling liquid flowing there through for improving heat dissipation because lots of heat generates and gathers around the electrode core 3 during the discharging operation of the electrode head. If heat dissipation is poor, the electrode core 3 is easily damaged.

The electrode head 100 of the plasma cutting machine needs high electrical conductivity, therefore the choosing of materials for the parts of the electrode head is quite important. In the preferred embodiment of the present invention, it is preferred for the sheath 1 of the electrode head to be made of copper, because copper has relatively high electrical conductivity and low cost when compared to other electrical conductive materials. It is preferred for the bearing means 2 to be made of silver, because silver has even higher electrical conductivity than copper does, thereby the bearing means can have higher electrically conductive efficiency. It is preferred for the electrode core to be made of hafnium or zirconium. It is preferred for the electrode core to be made of hafnium because hafnium has relatively high discharging efficiency, high hardness and high mechanical strength. In addition, hafnium is not oxidized easily in the normal atmospheric temperature therefore the electrode head will not be easily harmed in the repeated operation of electron emission and has longer life. It is noticeable that the term of "brazing" includes silver brazing, copper brazing, aluminum brazing, etc, according to the brazing materials. In the preferred embodiment, silver brazing is preferred, and the preferred brazing materials consist of silver and copper. More preferably, the brazing material comprises 20%~80% silver.

Figure 3:
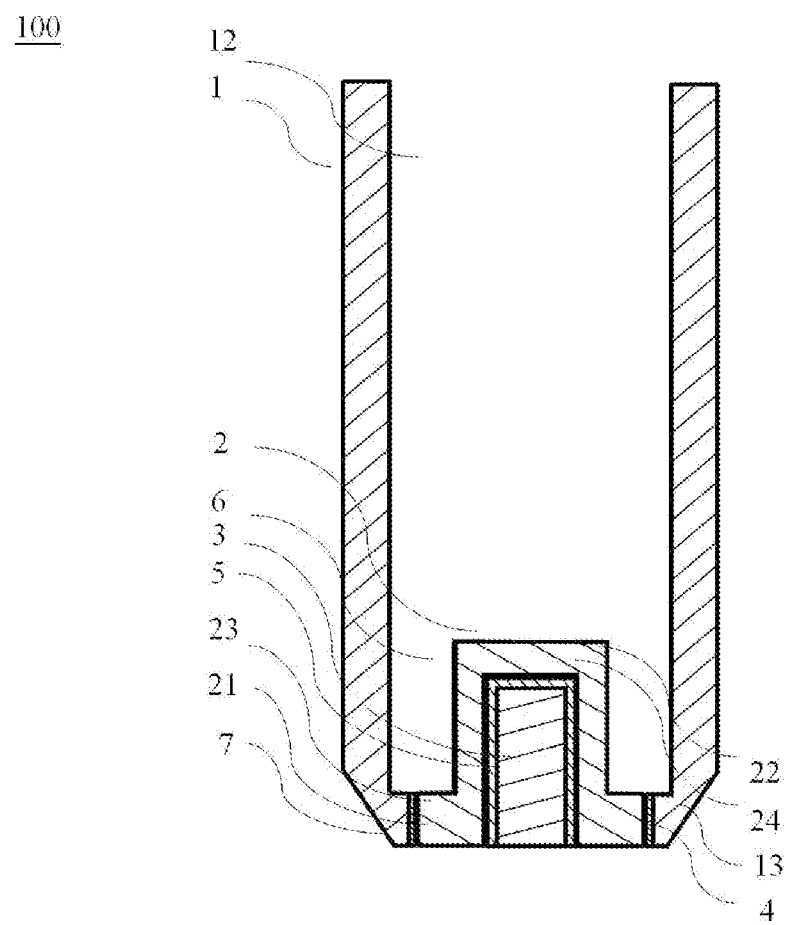
FIG. 3 is another cross-sectional view of an electrode head of the plasma cutting machine according to a preferred embodiment of the present invention.

As shown in FIG. 3, an annular chamfer portion 7 is further formed on the exterior surface where the sheath 1 and the first flange 13 connect each other. In some situations, the electrode head of the plasma cutting machine with the chamfer portion 7 can be used more easily to conduct the discharging operation than the one without the chamfer portion.

It is noticeable that the present invention provides an electrode head of the plasma cutting machine, wherein the sheath 1, the bearing means 2 and the electrode core 3 are assembled together by brazing. According to the present invention, it doesn't need high compression force during the assembling process. Meanwhile, the engagement strength achieved by the brazing is greater than that achieved by the interference fit, therefore, the parts of the electrode head 100 are more firmly engaged with each other. The electrode head of the present invention has higher mechanical strength than the prior arts.

By the way, to assemble the electrode head by brazing according to the present invention doesn't need complicated jigs for interference fit, therefore it is easier to manufacture the electrode head and the manufacturing cost will be lower.

Although some particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. An electrode head of the plasma cutting machine comprising a sheath (1), a bearing means (2), and an electrode core (3), characterized in that:

the electrode head further comprises a first brazing means (4) and a second brazing means (5), wherein the electrode head is assembled by using brazing and the second brazing means (5) consists of copper and silver;

the sheath (1) is hollow inside and comprises a first end (11) and a second end (12), wherein a first flange (13) is provided and extends radially from the first end (11) into the interior of the sheath (1);

the bearing means (2) is rod-shaped and comprises a third end (21) and a fourth end (22), wherein a second flange (23) is provided to be fixed to the first flange (13) of the sheath (1) via the first brazing means (4), and extends radially outward from the third end (21), and, a protrusion portion (24) is formed on the fourth end (22) and protrudes toward the interior of the sheath (1), a recess portion (25) is defined in the axial interior of the protrusion portion (24) with an opening on the third end (21), and the electrode core (3) is disposed in the recess portion (25) and is fixed to the bearing means (2) via the second brazing means (5), wherein the electrode core (3) is made of hafnium.

2. The electrode head of the plasma cutting machine of claim 1, wherein the second brazing means (5) has a thickness (T2) which ranging from 0.01 mm to 5 mm.

3. The electrode head of the plasma cutting machine of claim 2, wherein the second brazing means (5) is formed in a shape of tube with thin wall.

4. The electrode head of the plasma cutting machine of claim 2, wherein the electrode core (3) is rod-shaped, and the recess portion (25) is defined for disposing the correspondingly rod-shaped electrode core (3).

5. The electrode head of the plasma cutting machine of claim 2, wherein the electrode core (3) is in the shape of cylinder with equal radius, and the recess portion (25) is defined for disposing the corresponding electrode core (3).

6. The electrode head of the plasma cutting machine of claim 2, wherein the protrusion portion (24) forms a cylinder of equal radius, and an annular space (6) is defined between the protrusion portion (24) and the sheath (1).

7. The electrode head of the plasma cutting machine of claim 2, wherein the sheath (1) is made of copper and the bearing means (2) is made of silver.

8. The electrode head of the plasma cutting machine of claim 2, wherein an annular chamfer portion (7) is formed on the exterior surface where the sheath (1) and the first flange (13) connect each other.

9. The electrode head of the plasma cutting machine of claim 1, wherein the second brazing means (5) comprises 20%~80% silver.

10. The electrode head of the plasma cutting machine of claim 1, wherein the first brazing means (4) has a thickness (T1) ranging from 0.01 mm to 5 mm.

* * * * *